(12) United States Patent
Ooishi (10) Patent No.: US 9,227,850 B2
(45) Date of Patent: Jan. 5, 2016

(54) POSITIVE ELECTRODE ACTIVE MATERIAL FOR LITHIUM SECONDARY BATTERY, METHOD FOR PRODUCING THE SAME, AND LITHIUM SECONDARY BATTERY

(75) Inventor: Yoshihide Ooishi, Tokyo (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 842 days.

(21) Appl. No.: 13/499,766

(22) PCT Filed: Oct. 4, 2010

(86) PCT No.: PCT/JP2010/067370
§ 371 (c)(1),
(2), (4) Date: Jul. 17, 2012

(87) PCT Pub. No.: WO2011/043296
PCT Pub. Date: Apr. 14, 2011

(65) Prior Publication Data
US 2012/0273737 A1    Nov. 1, 2012

(30) Foreign Application Priority Data
Oct. 5, 2009 (JP) .................................. 2009-231841

(51) Int. Cl.
| | | |
|---|---|---|
| *H01M 4/485* | (2010.01) | |
| *C01G 23/00* | (2006.01) | |
| *H01M 4/525* | (2010.01) | |
| *C01G 51/00* | (2006.01) | |
| *H01M 4/52* | (2010.01) | |
| *H01M 4/48* | (2010.01) | |
| *H01M 4/02* | (2006.01) | |
| *H01M 4/131* | (2010.01) | |
| *H01M 10/052* | (2010.01) | |

(52) U.S. Cl.
CPC ............. *C01G 23/005* (2013.01); *C01G 51/42* (2013.01); *H01M 4/485* (2013.01); *H01M 4/525* (2013.01); *C01P 2002/77* (2013.01); *C01P 2004/61* (2013.01); *C01P 2004/80* (2013.01); *C01P 2006/12* (2013.01); *C01P 2006/40* (2013.01); *H01M 4/131* (2013.01); *H01M 4/48* (2013.01); *H01M 4/52* (2013.01); *H01M 10/052* (2013.01); *H01M 2004/028* (2013.01); *Y02E 60/122* (2013.01); *Y02T 10/7011* (2013.01)

(58) Field of Classification Search
CPC ......... H01M 4/48; H01M 4/52; H01M 4/525; H01M 4/485
USPC .......................... 252/182.1; 429/231.3, 231.5
See application file for complete search history.

(56) References Cited

U.S. PATENT DOCUMENTS 6,555,269 B2 * 4/2003 Cho et al. .................... 429/231.1
6,582,854 B1 * 6/2003 Qi et al. ..................... 429/231.95

FOREIGN PATENT DOCUMENTS

| JP | 05-013082 A | 1/1993 |
|---|---|---|
| JP | 2001-223008 A | 8/2001 |
| JP | 2002-151078 A | 5/2002 |
| JP | 2003-288899 A | 10/2003 |
| JP | 2005-123111 A | 5/2005 |
| JP | 2008-103308 A | 5/2008 |

OTHER PUBLICATIONS

International Search Report dated Dec. 14, 2010, issued for PCT/JP2010/067370.

* cited by examiner

*Primary Examiner* — Khanh Tuan Nguyen
*Assistant Examiner* — Haidung Nguyen
(74) *Attorney, Agent, or Firm* — Locke Lord LLP (57) ABSTRACT

[Problem to be Solved]
There can be provided a lithium secondary battery which, when used as a positive electrode active material for lithium secondary batteries, is particularly excellent in cycle characteristics and rate characteristics and low in direct current (DC) resistance and in which the swelling resulting from the generation of gas accompanying the reaction with a nonaqueous electrolyte solution is suppressed. There is also provided a positive electrode active material for lithium secondary batteries in which the positive electrode active material can be industrially advantageously produced.
[Solution]
The positive electrode active material for lithium secondary batteries according to the present invention includes a lithium-transition metal composite oxide containing from 0.20 to 2.00% by weight of Ti atoms, which is produced by mixing a lithium compound, a cobalt compound and titanium dioxide and then firing the resulting mixture, wherein the Ti atoms are present in the depth direction from the surface of the particles of the lithium-transition metal composite oxide and have a concentration gradient that is highest at the surface of the particles.

4 Claims, 1 Drawing Sheet

POSITIVE ELECTRODE ACTIVE MATERIAL FOR LITHIUM SECONDARY BATTERY, METHOD FOR PRODUCING THE SAME, AND LITHIUM SECONDARY BATTERY

TECHNICAL FIELD

The present invention relates to a positive electrode active material for lithium secondary batteries, a method for producing the same, and a lithium secondary battery which is particularly excellent in cycle characteristics and rate characteristics and low in direct current (DC) resistance and in which the swelling resulting from the generation of gas accompanying the reaction with a nonaqueous electrolyte solution is suppressed.

BACKGROUND ART

As the rapid progress of portable and cordless home-use electronics in recent years, lithium-ion secondary batteries have been put in practical use as a power source of small electronic equipment such as laptop personal computers, cellular phones, and video cameras. Regarding the lithium-ion secondary battery, it has been reported by Mizushima et al. in 1980 that lithium cobaltate is useful as a positive electrode active material for a lithium-ion secondary battery. Since then, extensive research and development on a lithium-based composite oxide has been carried out, and many proposals have been made.

However, a problem of lithium secondary batteries using lithium cobaltate is degradation of cycle characteristics due to the elution of cobalt atoms or the like.

Further, the following Patent Literature 1 proposes a lithium secondary battery using, as a positive electrode active material, a lithium cobalt-based composite oxide in which a part of the surface of the particles of lithium cobaltate is coated with titanium oxide and/or lithium titanate in an amount of 2.0 to 4.0% by mole in terms of Ti.

Furthermore, the following Patent Literature 2 proposes a lithium secondary battery using, as a positive electrode active material, a lithium cobalt-based composite oxide in which the presence ratio of titanium on the surface of the particles of lithium cobaltate is 20% or more.

In the positive electrode active materials containing Ti atoms according to the above Patent Literatures 1 to 2, Ti atoms are present only on the surface of the particles of lithium cobaltate in high concentrations and hardly present in the inner part of the particles. Further, in the lithium secondary batteries using these positive electrode active materials, it is difficult to obtain a lithium secondary battery which is excellent in cycle characteristics and rate characteristics and low in direct current (DC) resistance and in which the swelling resulting from the generation of gas accompanying the reaction with a nonaqueous electrolyte solution is suppressed.

CITATION LIST

Patent Literature

Patent Literature 1: Japanese Patent Laid-Open No. 2002-151078
Patent Literature 2: Japanese Patent Laid-Open No. 2005-123111

SUMMARY OF INVENTION

Technical Problem

The present invention has been made in view of such a background art, and an object of the present invention is to provide a positive electrode active material for lithium secondary batteries which, when used as a positive electrode active material for lithium secondary batteries, can provide a lithium secondary battery which is particularly excellent in cycle characteristics and rate characteristics and low in direct current (DC) resistance and in which the swelling resulting from the generation of gas accompanying the reaction with a nonaqueous electrolyte solution is suppressed, and to provide a method for producing the positive electrode active material for lithium secondary batteries in which the positive electrode active material can be industrially advantageously produced. Further, another object of the present invention is to provide a lithium secondary battery using the positive electrode active material, which is particularly excellent in cycle characteristics and rate characteristics and low in direct current (DC) resistance and in which the swelling resulting from the generation of gas accompanying the reaction with a nonaqueous electrolyte solution is suppressed.

Solution to Problem

As a result of extensive and intensive researches under such circumstances, the present inventors have found that a lithium secondary battery using, as a positive electrode active material, a lithium-transition metal composite oxide containing a specific amount of Ti atoms, which is produced by mixing a lithium compound, a cobalt compound and titanium dioxide and then firing the resulting mixture, wherein the Ti atoms contained have a particular concentration distribution in the depth direction from the surface of the particles, has excellent battery performance. Specifically, this lithium secondary battery is particularly excellent in cycle characteristics and rate characteristics and low in direct current (DC) resistance, and in this battery, the swelling resulting from the generation of gas accompanying the reaction with a nonaqueous electrolyte solution is suppressed. The present invention has been completed based on these findings.

Specifically, a first aspect to be provided by the present invention is a positive electrode active material for lithium secondary batteries comprising a lithium-transition metal composite oxide containing from 0.20 to 2.00% by weight of Ti atoms, which is produced by mixing a lithium compound, a cobalt compound and titanium dioxide and then firing the resulting mixture, wherein the Ti atoms are present in the depth direction from the surface of the particles of the lithium-transition metal composite oxide and have a concentration gradient that is highest at the surface of the particles.

Further, a second aspect to be provided by the present invention is a method for producing a positive electrode active material for lithium secondary batteries comprising a method for producing a lithium-transition metal composite oxide containing Ti atoms comprising mixing a lithium compound, a cobalt compound and titanium dioxide and then firing the resulting mixture, wherein the lithium compound, the cobalt compound and the titanium dioxide are mixed at a molar ratio of lithium atoms to cobalt atoms and titanium atoms (Li/(Co+Ti)) of 0.90 or more and a molar ratio of Ti atoms to Co atoms (Ti/Co) of 0.005 to 0.030, and the resulting mixture is fired.

Further, a third aspect to be provided by the present invention is a lithium secondary battery, wherein the positive electrode active material for lithium secondary batteries of the first aspect is used.

Advantageous Effects of Invention

When used as a positive electrode active material for lithium secondary batteries, the positive electrode active material of the present invention can provide a lithium secondary battery which is particularly excellent in cycle characteristics and rate characteristics and low in direct current (DC) resistance and in which the swelling resulting from the generation of gas accompanying the reaction with a nonaqueous electrolyte solution is suppressed.

Further, according to the method for producing the positive electrode active material for lithium secondary batteries of the present invention, the positive electrode active material for lithium secondary batteries can be produced by an industrially advantageous method.

DESCRIPTION OF EMBODIMENTS

Hereinafter, the present invention will be described based on the preferred embodiments thereof.

The positive electrode active material for lithium secondary batteries (hereinafter, may be simply referred to as "positive electrode active material") according to the present invention basically comprises a lithium-transition metal composite oxide containing Ti atoms which is produced by mixing a lithium compound, a cobalt compound and titanium dioxide and then firing the resulting mixture.

The positive electrode active material for lithium secondary batteries according to the present invention is characterized in that the active material is a lithium-transition metal composite oxide containing from 0.20 to 2.00% by weight of Ti atoms.

In the present invention, the content of Ti atoms is set to the above range because if the content of Ti atoms is less than 0.20% by weight, direct current (DC) resistance is improved but the improvement effect of rate characteristics tends to be small since Ti atoms are present only on the surface of the particles of the lithium-transition metal composite oxide and the presence in the inner part is poor; on the other hand, if it exceeds 2.00% by weight, sufficient discharge capacity is not obtained, and Ti atoms may be independently present as $Li_2TiO_3$ particles separately from the particles of the lithium-transition metal composite oxide. Note that, in the present invention, a content of Ti atoms of 0.40 to 1.20% by weight is particularly preferred because Ti atoms are not only present in the depth direction from the surface of the particles of the lithium-transition metal composite oxide and have a concentration gradient that is highest at the surface of the particles, but also sufficiently present in the inner part of the particles, which can further improve characteristics such as direct current (DC) resistance and rate characteristics.

In a large number of conventional lithium-transition metal composite oxides containing Ti atoms, Ti atoms are uniformly present in the inner part of the particles, or Ti atoms are present on the surface of the particles. On the other hand, in the positive electrode active material for lithium secondary batteries of the present invention, Ti atoms are present both in the inner part of the particles and on the surface thereof. Further, the positive electrode active material for lithium secondary batteries of the present invention has one feature in the state of the concentration distribution of Ti atoms from the surface of the particles to the inner part thereof. Specifically, Ti atoms are present in the inner part of the particles of the lithium-transition metal composite oxide in the depth direction from the surface of the particles and have a concentration gradient that is highest at the surface of the particles.

In the present invention, the expression that "Ti atoms are present in the depth direction from the surface of the particles of the lithium-transition metal composite oxide and have a concentration gradient that is highest at the surface of the particles" refers to that the presence of Ti atoms in the depth direction at least to 50 nm can be verified by X-ray photoelectron spectroscopy (XPS) analysis, and the Ti atoms have a concentration gradient that is highest at the surface of the particles over the range from 50 nm in the depth direction to the surface of the particles. Accordingly, in the present invention, the concentration gradient may be a regular concentration gradient or an irregular concentration gradient. Further, the concentration difference between the concentration of Ti atoms at 50 nm in the depth direction and the concentration of Ti atoms that is highest at the surface of the particles is preferably more than twice.

The concentration gradient of Ti atoms can be verified by analyzing the cross section of the particles of the lithium-transition metal composite oxide by X-ray photoelectron spectroscopy (XPS) analysis and a field emission electron probe microanalyzer (FE-EPMA).

In the present invention, it is one of the features of the present invention that the Ti atoms of the lithium-transition metal composite oxide are present as at least $Li_2TiO_3$.

The presence of $Li_2TiO_3$ can be verified from the presence of the diffraction peak of $Li_2TiO_3$ at $2\theta=20.5°$, when the lithium-transition metal composite oxide is analyzed by X-ray diffraction (XRD) analysis using the CuKα radiation as a radiation source. The present inventors estimate that Ti atoms which are present on the surface of the particles of the lithium-transition metal composite oxide in high concentrations are present in the form of $Li_2TiO_3$.

Further, in the positive electrode active material for lithium secondary batteries of the present invention, Ti atoms to be contained in the lithium-transition metal composite oxide affect the crystal structure of pure $LiCoO_2$. Specifically, the lattice constant of the C axis of pure $LiCoO_2$ is from 14.050 to 14.055 angstroms, but in the positive electrode active material for lithium secondary batteries of the present invention, the lattice constant of the C axis is from 14.055 to 14.070 angstroms, preferably from 14.060 to 14.065 angstroms, which are larger than the lattice constant of the C axis of pure $LiCoO_2$. Furthermore, in the positive electrode active material for lithium secondary batteries of the present invention, the crystallite size of pure $LiCoO_2$ is from 700 to 750 angstroms in the direction of the (104) plane; on the other hand in the positive electrode active material for lithium secondary batteries of the present invention, the crystallite size is from 550 to 700 angstroms, preferably from 550 to 650 angstroms in the direction of the (104) plane, the crystallite size being smaller than that of pure $LiCoO_2$ in the direction of the (104) plane.

The present inventors estimate that this is the influence of Ti atoms which are present in the inner part of the particles of the lithium-transition metal composite oxide.

Further, the positive electrode active material for lithium secondary batteries of the present invention is preferred from the viewpoint that it has not only the above characteristics but also has a further enhanced effect of suppressing the swelling resulting from the generation of gas accompanying the reaction with a nonaqueous electrolyte solution when $Li_2CO_3$ is contained in an amount of 0.10% by weight or less, preferably 0.05% by weight or less.

With respect to other preferred physical properties of the positive electrode active material for lithium secondary batteries of the present invention, the average particle size determined by a laser diffraction and scattering method is preferably in the range of 1 to 30 μm, preferably from 3 to 25 μm from the viewpoint that a coating film having a uniform thickness can be formed. Further, the BET specific surface area is preferably in the range of 0.05 to 2.00 $m^2/g$, preferably from 0.10 to 0.80 $m^2/g$ from the viewpoint of the suppression of the swelling resulting from the generation of gas accompanying the reaction with a nonaqueous electrolyte solution and safety.

The positive electrode active material for lithium secondary batteries of the present invention having the various physical properties as described above can be produced by a method for producing a lithium-transition metal composite oxide containing Ti atoms comprising mixing a lithium compound, a cobalt compound and titanium dioxide and then firing the resulting mixture, wherein the lithium compound, the cobalt compound and the titanium dioxide are mixed at a molar ratio of lithium atoms to cobalt atoms and titanium atoms (Li/(Co+Ti)) of 0.90 or more and a molar ratio of Ti atoms to Co atoms (Ti/Co) of 0.005 to 0.030, and the resulting mixture is fired.

Examples of the lithium compound as a raw material include an oxide, a hydroxide, a carbonate, a nitrate and an organic acid salt of lithium, and among them, lithium carbonate which is industrially inexpensive is preferred. Further, a lithium compound having an average particle size of 0.1 to 200 μm, preferably from 2 to 50 μm is particularly preferred because such a lithium compound has good reactivity.

Examples of the cobalt compound as a raw material include an oxide, an oxyhydroxide, a hydroxide, a carbonate, a nitrate and an organic acid salt of cobalt, and among them, cobalt oxide is preferred because it is easily available industrially and is inexpensive. Further, a cobalt compound having an average particle size of 0.5 to 30 μm, preferably from 2.0 to 25.0 μm is particularly preferred because such a cobalt compound has good reactivity.

The titanium dioxide as a raw material is generally industrially produced by a chlorine method or a sulfuric acid method, and in the present invention, both titanium dioxide produced by a chlorine method and that produced by a sulfuric acid method may be used without particular limitation.

In the present invention, titanium dioxide having a BET specific surface area of 1 $m^2/g$ or more, preferably 5 $m^2/g$ or more, particularly in the range of 5 to 50 $m^2/g$ is preferably used from the viewpoint that it has good reactivity with a cobalt compound as a raw material. Titanium dioxide having a BET specific surface area of 1 $m^2/g$ or more is used because titanium dioxide having a BET specific surface area of less than 1 $m^2/g$ has poor reactivity with a cobalt compound as a raw material, thereby providing a tendency of poor presence of Ti atoms in the inner part of the lithium-transition metal composite oxide. Further, titanium dioxide having an average particle size determined by a laser diffraction and scattering method of 5 μm or less, preferably from 0.1 to 2 μm is preferred from the viewpoint that such titanium oxide has good reactivity with a cobalt compound.

The crystal structure of titanium dioxide is roughly classified into the anatase type and the rutile type, and both can be used in the present invention. However, titanium oxide having an anatase-type content of 70% by weight or more is particularly preferably used.

Further, the lithium compound, cobalt compound and titanium dioxide as raw materials preferably have an impurity content as low as possible in order to produce a high purity lithium-transition metal composite oxide, but due to a production history or the like, a high-concentration sulfate group may be inevitably contained particularly in the cobalt compound and titanium dioxide. In this case, it is preferred to suitably select each raw material and use it so that the sulfate group contained in the resulting lithium-transition metal composite oxide may be 0.3% by weight or less in terms of $SO_4$.

The reaction operation includes first mixing a predetermined amount of the lithium compound, cobalt compound and titanium dioxide as raw materials. The mixing may be a dry process or a wet process, but the former is preferred because of simple production. In the case of dry mixing, it is preferable to use a blender or the like so that raw materials are uniformly mixed.

The blending ratio of the lithium compound, cobalt compound and titanium dioxide as raw materials as described above is set so that the molar ratio of lithium atoms to cobalt atoms and titanium atoms (Li/(Co+Ti)) is 0.90 or more. This is because the discharge capacity tends to be significantly reduced if the molar ratio of lithium atoms to cobalt atoms and titanium atoms (Li/(Co+Ti)) is less than 0.90.

In the present invention, the molar ratio of lithium atoms to cobalt atoms and titanium atoms (Li/(Co+Ti)) is particularly preferably in the range of 0.98 to 1.10 from the viewpoint that stable discharge capacity can be obtained. In addition, the molar ratio of Ti atoms to Co atoms (Ti/Co) is from 0.005 to 0.030. This is because if the molar ratio of Ti atoms to Co atoms (Ti/Co) is less than 0.005, direct current (DC) resistance is improved but the improvement effect of rate characteristics tends to be small since Ti atoms are present only on the surface of the particles of the lithium-transition metal composite oxide and the presence in the inner part is poor; on the other hand, if it exceeds 0.030, sufficient discharge capacity is not obtained, and Ti atoms may be independently present as $Li_2TiO_3$ particles. In the present invention, a molar ratio of Ti atoms to Co atoms (Ti/Co) of 0.010 to 0.020 is particularly preferred from the viewpoint that Ti atoms are not only present in the depth direction from the surface of the particles of the lithium-transition metal composite oxide and have a concentration gradient that is highest at the surface of the particles, but also sufficiently present in the inner part of the particles, which improves both direct current (DC) resistance and rate characteristics.

Subsequently, a mixture in which the raw materials are uniformly mixed is fired. It is preferred to perform the firing at 800° C. or more in the present invention. This is because the reactivity between the cobalt compound and titanium dioxide as raw materials is low at a firing temperature of less than 800° C., and as a result, the presence of Ti atoms in the inner part of the lithium-transition metal composite oxide is poor, and the improvement effect of rate characteristics tends to be small. In the present invention, firing particularly at 900° C. or more, more preferably in the range of 1000 to 1100° C. is preferred from the viewpoint that a reaction successfully proceeds. The reaction clearly provides a tendency in which Ti atoms are present in the depth direction from the surface of the particles of the lithium-transition metal composite oxide and have a concentration gradient that is highest at the surface of the particles.

Firing is performed in atmospheric air or in an oxygen atmosphere. Note that in order to positively produce $Li_2TiO_3$, air, oxygen gas and the like are preferably positively circulated during the reaction. Further, the firing can be performed any number of times as needed, and in order to obtain uniform powder characteristics, the mixture is once fired and then ground, and the ground fired mixture may be fired again. After the firing, the mixture is appropriately cooled, and the cooled mixture is ground and classified as needed to obtain the lithium-transition metal composite oxide containing Ti atoms, which is used as the positive electrode active material for lithium secondary batteries of the present invention.

Note that the grinding performed as needed is appropriately performed when the lithium-transition metal composite oxide containing Ti atoms obtained by firing is a weakly combined block like material. The particles of the lithium-transition metal composite oxide themselves have a specific average particle size and BET specific surface area. Specifically, the resulting lithium-transition metal composite oxide containing Ti atoms has an average particle size of 1 to 30 μm, preferably from 3 to 25 μm, and a BET specific surface area of 0.05 to 2.00 $m^2/g$, preferably from 0.10 to 0.80 $m^2/g$.

Further, the lithium-transition metal composite oxide used as the positive electrode active material for lithium secondary batteries in the present invention has the above powder characteristics, in addition to which it contains Ti atoms in an amount of 0.20 to 2.00% by weight, preferably from 0.40 to 1.20% by weight, wherein the Ti atoms are present in the depth direction from the surface of the particles of the lithium-transition metal composite oxide and have a concentration gradient that is highest at the surface of the particles.

Further, according to the preferred embodiments of the present invention, the Ti atoms which are present in the lithium-transition metal composite oxide are present as $Li_2TiO_3$ at least on the surface of the particles, in addition to which the lithium-transition metal composite oxide has a lattice constant of the C axis in the range of 14.055 to 14.070 angstroms, preferably from 14.060 to 14.065 angstroms and has a crystallite size in the range of 550 to 700 angstroms, preferably from 550 to 650 angstroms in the direction of the (104) plane, and the Ti atoms are present also in the inner part of the particles. Further, the lithium-transition metal composite oxide preferably has a residual $Li_2CO_3$ content of 0.10% by weight or less, preferably 0.05% by weight or less.

The lithium secondary battery according to the present invention uses the above positive electrode active material for lithium secondary batteries and comprises a positive electrode, a negative electrode, a separator, and a nonaqueous electrolyte containing a lithium salt. The positive electrode is formed, for example, by coating and drying a positive electrode mixture on a positive electrode current collector. The positive electrode mixture comprises a positive electrode active material, a conducting agent, a binder, and a filler to be added as needed. The lithium secondary battery according to the present invention has a positive electrode to which the lithium composite containing Ti atoms as described above as a positive electrode active material is uniformly applied. Therefore, the lithium secondary battery according to the present invention has a reduced direct current (DC) resistance and hardly causes reduction in load characteristics and cycle characteristics.

The positive active material content in the positive mixture is in the range of 70% to 100% by mass, and preferably in the range of 90% to 98% by mass.

The positive charge collector can be made of any electron conducting material, as long as the material does not chemically change in the battery. Exemplary materials of the cathode charge collector include stainless steel, nickel, aluminum, titanium, fired carbon, and aluminum or stainless steel surface-treaded with carbon, nickel, titanium, or silver. These materials may be surface-treated by oxidation, or have asperities at the surface formed by surface treatment. The cathode charge collector may be in a form of foil, film, sheet, net, punched sheet, lath body, porous body, foamed body, fiber, or formed nonwoven fabric. The thickness of the cathode charge collector is preferably, but not limited to, 1 to 500 μm.

Any electron-conducting material can be used as the conducting agent without particular limitation as long as the battery using the conducting agent will not chemically change. Examples of the conducting agent include: graphite, such as natural graphite and artificial graphite; carbon black materials, such as carbon black, acetylene black, Ketjen Black, channel black, furnace black, lampblack, and thermal black; conductive fibers, such as carbon fiber and metal fiber; carbon fluoride; metal powders, such as aluminum powder and nickel powder; conductive whiskers, such as zinc oxide and potassium titanate; conductive metal oxides, such as titanium oxide; and other conductive materials such as polyphenylene derivatives. Natural graphite may vein graphite, flake graphite, or amorphous graphite. These conducting agents may be used singly or in combination. The conducting agent content in the positive mixture is in the range of 1% to 50% by mass, and preferably in the range of 2% to 30% by mass.

Examples of the binder include starch, polyvinylidene fluoride, polyvinyl alcohol, carboxymethyl cellulose, hydroxypropyl cellulose, recycled cellulose, diacetyl cellulose, polyvinylpyrrolidone, tetrafluoroethylene, polyethylene, polypropylene, ethylene-propylene-dieneter polymer (EPDM), sulfonated EPDM, styrene butadiene rubber, fluorine rubber, tetrafluoroethylene-hexafluoroethylene copolymer, tetrafluoroethylene-hexafluoropropylene copolymer, tetrafluoroethylene-perfluoroalkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethyl vinyl ether-tetrafluoroethylene copolymer, ethylene-acrylic acid copolymer and its sodium ion-cross-linked polymer, ethylene-methacrylic acid copolymer and its sodium ion-cross-linked polymer, ethylene-methyl acrylate copolymer and its sodium ion-cross-linked polymer, ethylene-methyl methacrylate copolymer and its sodium ion-cross-linked polymer, polysaccharides such as polyethylene oxide, thermoplastic resins, and rubber-elastic polymers. These binders may be used singly or in combination. If a compound having a functional group capable of reacting with lithium, such as polysaccharides, is used as the binder, the functional group is preferably deactivated by adding, for example, an isocyanate group. The binder content in the positive mixture is in the range of 1% to 50% by mass, and preferably in the range of 5% to 15% by mass.

The filler is intended to suppress the volume expansion of the positive, and is added to the positive mixture as required. Any fiber can be used as the filler as long as it does not chemically change in the battery. Examples of the filler include olefin polymer fibers, such as polypropylene fiber and polyethylene fiber, and glass and carbon fibers. The filler content in the positive mixture is preferably, but not limited to, 0% to 30% by mass.

The negative is formed by applying a negative material onto a negative charge collector, followed by drying. The negative charge collector can be made of any electron conducting material, as long as the material does not chemically change in the battery. Exemplary materials of the negative charge collector include stainless steel, nickel, copper, titanium, aluminum, fired carbon, steel or stainless steel surface-treated with carbon, nickel, titanium, or silver, and aluminum-cadmium alloys. These materials may be surface-treated by oxidation, or have asperities at the surface formed by surface treatment. The negative charge collector may be in a form of foil, film, sheet, net, punched sheet, lath body, porous body, foamed body, fiber, or formed nonwoven fabric. The thickness of the anode charge collector is preferably, but not limited to, 1 to 500 µm.

Examples of the negative material include, but not limited to, carbonaceous materials, metal complex oxides, lithium metal, lithium alloys, silicon alloys, tin alloys, metal oxides, conductive polymers, chalcogenides, and Li—Co—Ni materials. Carbonaceous materials used as the anode material include, for example, non-graphitizable carbon materials and graphitic carbon materials. Metal complex oxides used as the anode material may be expressed by the formulas: $Sn_p(M^1)_{(1-p)}(M^2)_qO_r$ (where $M^1$ represents at least one element selected from the group consisting of Mn, Fe, Pb, and Ge, $M^2$ represents at least one element selected from the group consisting of Al, B, P, Si, Group I elements, Group II elements, Group III elements, and halogen elements, $0<p\leq1$, $1\leq q\leq3$, $1\leq r\leq8$); $Li_xFe_2O_3$ (where $0\leq x\leq1$); and $Li_xWO_2$ (where $0\leq x\leq1$). Metal oxides used as the anode material include $GeO$, $GeO_2$, $SnO$, $SnO_2$, $PbO$, $PbO_2$, $Pb_2O_3$, $Pb_3O_4$, $Sb_2O_3$, $Sb_2O_4$, $Sb_2O_5$, $Bi_2O_3$, $Bi_2O_4$, and $Bi_2O_5$. Conductive polymers used as the negative material include polyacetylene and poly-p-phenylene.

The separator is made of an insulating thin film having a high ion permeability and a specific mechanical strength. Form the viewpoint of resistance to organic solvents and hydrophobicity, a sheet or nonwoven fabric made of an olefin polymer such as polypropylene, glass fiber, or polyethylene is used as the separator. The separator has pores having a size generally useful for batteries, and the pore size is for example, 0.01 to 10 µm. The thickness of the separator can be in a range generally used for batteries, and may be, for example, 5 to 300 µm. If a solid electrolyte made of, for example, a polymer is used as the below-described electrolyte, the solid electrolyte may double as the separator.

The lithium salt-containing nonaqueous electrolyte is constituted of a nonaqueous electrolyte and a lithium salt. The nonaqueous electrolyte may be a liquid, an organic solid, or an inorganic solid. The nonaqueous liquid electrolyte may be an aprotic organic solvent or a mixture of aprotic organic solvents. Exemplary aprotic organic solvents include N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphotriester, trimethoxymethane, dioxolane derivatives, sulfolane, methylsulfolane, 3-methyl-2-oxazolidinone, 1,3-dimethyl-2-imidazolidinone, propylene carbonate derivatives, tetrahydrofuran derivatives, diethyl ether, 1,3-propane sultone, methyl propionate, and ethyl propionate.

Exemplary organic solid electrolytes include polyethylene derivatives, polyethylene oxide derivatives and polymers containing a polyethylene oxide derivative, polypropylene oxide derivatives and polymers containing a polypropylene oxide derivative, phosphate polymers, polymers containing an ionic leaving group, such as polyphosphazenes, polyaziridines, polyethylene sulfide, polyvinyl alcohol, polyvinylidene fluoride, and polyhexafluoropropylene, and a mixture of a polymer containing an ionic leaving group and an above-described nonaqueous electrolyte.

The inorganic solid electrolyte may be a nitride, halide, oxoate or sulfide of lithium. Exemplary inorganic solid electrolytes include $Li_3N$, $LiI$, $Li_5NI_2$, $Li_3N\_LiI\_LiOH$, $LiSiO_4$, $LiSiO_4\_LiI\_LiOH$, $Li_2SiS_3$, $Li_4SiO_4$, $Li_4SiO_4\_LiI\_LiOH$, $P_2S_5$, $Li_2S$, $Li_2S\_P_2S_5$, $Li_2S\_SiS_2$, $Li_2S$—$GeS_2$, $Li_2S\_Ga_2S_3$, $Li_2S$—$B_2S_3$, $Li_2S$—$P_2S_5$—X, $Li_2S$—$SiS_2$—X, $Li_2S$—$GeS_2$—X, $Li_2S$—$Ga_2S_3$—X, and $Li_2S$—$B_2S_3$—X (where X represents at least one compound selected from the group consisting of $LiI$, $B_2S_3$, and $Ai_2S_3$).

If the inorganic solid electrolyte is amorphous (vitreous), the inorganic solid electrolyte may contain a compound containing oxygen, such as lithium phosphate ($Li_3PO_4$), lithium oxide ($Li_2O$), lithium sulfate ($Li_2SO_4$), phosphorus oxide ($P_2O_5$), or lithium borate ($Li_3BO_3$); or compound containing nitrogen, such as $Li_3PO_{4-x}N_{2x/3}$ (where $0<x<4$), $Li_4SiO_{4-x}N_{2x/3}$ (where $0<x<4$), $Li_4GeO_{4-x}N_{2x/3}$ (where $0<x<4$), or $Li_3BO_{3-x}N_{2x/3}$ (where $0<x<3$). By adding an oxygen-containing compound or a nitrogen-containing compound, lithium ions are allowed to hop the unshared electron pair of the oxygen or nitrogen atom and, thus, the lithium ion conductivity can be enhanced.

The lithium salt used in the lithium salt-containing nonaqueous electrolyte is soluble in the nonaqueous electrolyte. Exemplary such lithium salts include $LiCl$, $LiBr$, $LiI$, $LiClO_4$, $LiBF_4$, $LiB_{10}Cl_{10}$, $LiPF_6$, $LiCF_3O_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $(C_2O_4)_2BLi$, chloroborane lithium, lithium lower aliphatic carboxylates, lithium tetraphenylborate, and lithium imides. These lithium salts may be use singly or in combination.

The nonaqueous electrolyte may contain another compound to enhance the charge/discharge characteristics and the flame retardancy: Examples of such compounds include pyridine, triethylphosphite, triethanolamine, cyclic ethers, ethylenediamine, n-glyme, hexaphosphoric triamide, nitrobenzene derivatives, sulfur, quinonimine dyes, N-substituted oxazolidinone, N,N-substituted imidazolidine, ethylene glycol dialkyl ethers, ammonium salts, polyethylene glycol, pyrrole, 2-methoxyethanol, aluminum trichloride, monomers of electroconductive polymer electrode active materials, triethylenephosphonamide, trialkylphosphine, morpholine, aryl compounds having a carbonyl group, hexamethylphosphoric triamide, 4-alkylmorpholin, bicycle tertiary amine, oil, phosphonium salts, tertiary sulfonium salts, phosphazene, and carbonic esters. The nonaqueous electrolyte liquid may contain a halogen-containing solvent, such as carbon tetrachloride or ethylene trifluoride, to make the electrolyte noncombustible. The nonaqueous electrolyte liquid may contain carbonic acid gas so as to be storable at high temperatures.

The lithium ion secondary battery of an embodiment of the invention exhibits high performance, particularly high cycling characteristics, and may be in any form, including button, sheet, cylinder, prism, and coin.

The lithium ion secondary battery can be used in any devices and apparatuses, including automobiles, electromotive vehicles, game machines and other consumer appliances, such as electronic notebook personal computers, laptop personal computers, pocket word processors, cellular phones, cordless slaves, portable CD players, radios, liquid crystal TV sets, backup power sources, electric shavers, memory cards, and video movie cameras/recorders/players.

EXAMPLES

Hereinafter, the present invention will be described in detail with reference to Examples, but the present invention is not limited to these.

<Titanium Dioxide Sample>

Titanium dioxide ($TiO_2$) having the following physical properties was used. Note that the average particle size was determined by a laser diffraction and scattering method.

TABLE 1

| Crystal Structure | BET specific surface area (m²/g) | Average particle size (μm) |
|---|---|---|
| Anatase Rutile-type content of 28% by weight | 20.0 | 0.3 |

Note) produced by Showadenko; product name; F1

Examples 1 to 4

Tricobalt tetroxide (having an average particle size of 5 μm) and lithium carbonate (having an average particle size of 7 μm) were weighed so that the molar ratios of Co atoms and Li atoms shown in Table 2 may be obtained, and thereto was added the titanium dioxide shown in Table 1 so that the molar ratios shown in Table 2 may be obtained, and these components were sufficiently dry-mixed for 60 seconds using a mixer for home use to obtain raw material mixtures. Then, the resulting raw material mixtures were each fired in an alumina bowl at a temperature as shown in Table 2 in atmospheric air which was circulated. After completion of firing, the fired materials were each ground and classified to obtain a lithium-transition metal composite oxide containing Ti atoms.

Comparative Example 1

Tricobalt tetroxide (having an average particle size of 5 μm) and lithium carbonate (having an average particle size of 7 μm) were weighed so that the molar ratios of Co atoms and Li atoms shown in Table 2 may be obtained, and these components were sufficiently dry-mixed for 60 seconds using a mixer for home use to obtain a raw material mixture. Then, the resulting raw material mixture was fired in an alumina bowl at a temperature and for a period of time as shown in Table 2 in atmospheric air. After completion of firing, the fired material was ground and classified to obtain a lithium-transition metal composite oxide.

Comparative Examples 2 to 4

Tricobalt tetroxide (having an average particle size of 5 μm) and lithium carbonate (having an average particle size of 7 μm) were weighed so that the molar ratios of Co atoms and Li atoms shown in Table 2 may be obtained, and thereto was added the titanium dioxide shown in Table 1 so that the molar ratios shown in Table 2 may be obtained, and these components were sufficiently dry-mixed for 60 seconds using a mixer for home use to obtain raw material mixtures. Then, the resulting raw material mixtures were each fired in an alumina bowl at a temperature and for a period of time as shown in Table 2 in atmospheric air which was circulated. After completion of firing, the fired materials were each ground and classified to obtain a lithium-transition metal composite oxide containing Ti atoms.

TABLE 2

| | Mole ratios of each raw materials in terms of raw material mixtures | | | | Firing temperature (° C.) |
|---|---|---|---|---|---|
| | Li atoms | Co atoms | Ti atoms | Li/(Co + Ti) | |
| Example 1 | 1.005 | 1.000 | 0.005 | 1.000 | 1000 |
| Example 2 | 1.010 | 1.000 | 0.010 | 1.000 | 1000 |
| Example 3 | 1.020 | 1.000 | 0.020 | 1.000 | 1000 |
| Example 4 | 1.029 | 1.000 | 0.030 | 0.999 | 1000 |
| Comparative Example 1 | 1.000 | 1.000 | — | 1.000 | 900 |
| Comparative Example 2 | 1.001 | 1.000 | 0.001 | 1.000 | 900 |
| Comparative Example 3 | 1.002 | 1.000 | 0.003 | 0.999 | 1000 |
| Comparative Example 4 | 1.048 | 1.000 | 0.050 | 0.999 | 1000 |

<Evaluation of Physical Properties of Lithium-Transition Metal Composite Oxides>

The lithium-transition metal composite oxides obtained in Examples and Comparative Examples were determined for the content of Ti atoms, the content of $LiCO_3$, the average particle size, the BET specific surface area, the state of the distribution of Ti atoms, the presence or absence of $Li_2TiO_3$, the lattice constant of the C axis and the crystallite size in the direction of the (104) plane. The results are shown in Table 4.

(1) The Content of Ti Atoms

The Ti content is a value determined by dissolving a sample with an acid and measuring the solution by ICP.

(2) $Li_2CO_3$ Content

Five grams of a sample and 100 g of pure water are weighed into a beaker and dispersed for 5 minutes using a magnetic stirrer. Subsequently, the resulting dispersion was filtered and 30 ml of the resulting filtrate was titrated with 0.1N HCl by using an automatic titrator (Model COMTITE-2500) to calculate the content of residual $Li_2CO_3$.

(3) Average Particle Size

The average particle size was measured by a laser diffraction and scattering method.

(4) The State of the Distribution of Ti Atoms

The lithium-transition metal composite oxide particles obtained in Example 2 was subjected to X-ray photoelectron spectroscopy (XPS) analysis to etch the surface with argon to measure the Ti peaks in the depth direction. The results are shown in Table 3 and FIG. 1. The concentration distributions in the depth direction of Co atoms, O atoms, C atoms, and Li atoms are shown together in Table 3.

Note that the conditions of X-ray photoelectron spectroscopy analysis are as follows:

Etching rate; 7.7 nm/min (surface etching with Ar), Etching time; 10 sec×2 times, 20 sec×2 times, 1 min×2 times, 2 min×2 times, and 3 min×2 times.

TABLE 3

| Time (sec.) | Mass Concentration (%) | | | | | Depth direction (nm) |
|---|---|---|---|---|---|---|
| | Co 2p | O 1s | Ti 2p | C 1s | Li 1s | |
| 0 | 44.59 | 34.75 | 6.34 | 8.33 | 5.99 | 0 |
| 10 | 57.26 | 33.06 | 4.12 | 0.63 | 4.92 | 1 |

TABLE 3-continued

| Time | Mass Concentration (%) | | | | | Depth direction |
|---|---|---|---|---|---|---|
| (sec.) | Co 2p | O 1s | Ti 2p | C 1s | Li 1s | (nm) |
| 20 | 62.72 | 29.44 | 3.06 | 0.39 | 4.39 | 3 |
| 40 | 64.97 | 28.04 | 2.79 | 0.3 | 3.91 | 5 |
| 60 | 67.43 | 26.63 | 2.11 | 0.07 | 3.76 | 8 |
| 120 | 59.38 | 25.3 | 1.75 | 0 | 3.56 | 15 |
| 180 | 70.68 | 24.34 | 1.62 | 0 | 3.36 | 23 |
| 300 | 70.94 | 24.44 | 1.29 | 0 | 3.33 | 39 |
| 420 | 71.38 | 24.19 | 1.08 | 0 | 3.36 | 54 |
| 600 | 71.69 | 24.28 | 0.92 | 0 | 3.11 | 77 |
| 780 | 71.39 | 24.34 | 0.83 | 0 | 3.15 | 100 |

Figure 1:
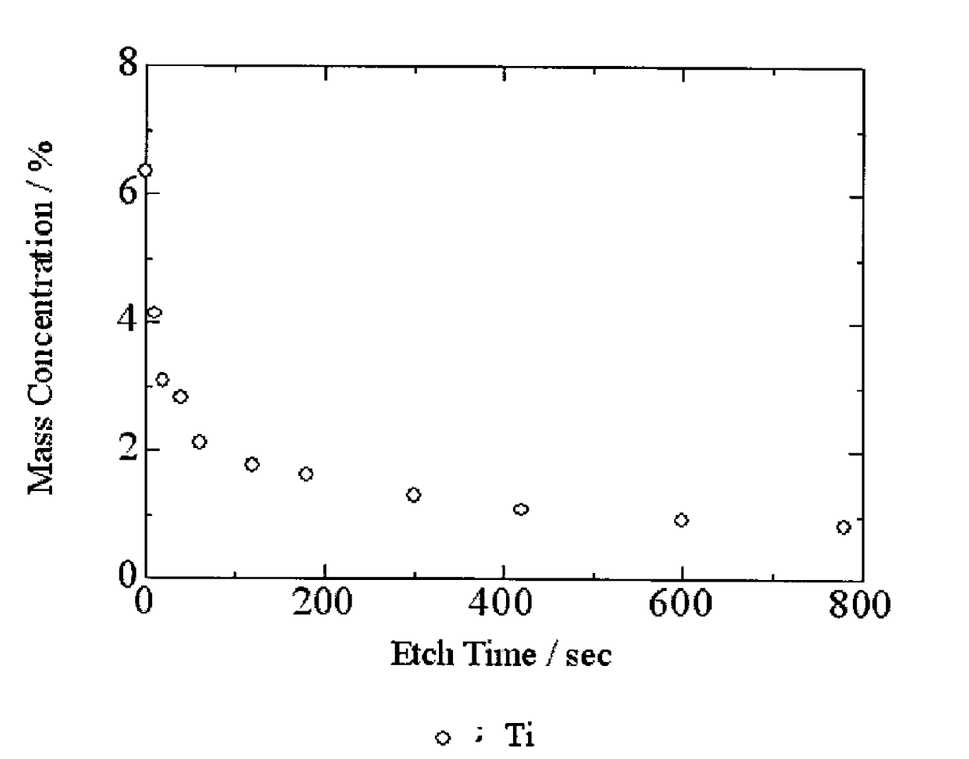
FIG. 1 is a graph showing the amount of titanium atoms in the depth direction of the lithium-transition metal composite oxide obtained in Example 2.

The results in Table 3 and FIG. 1 reveal that Ti atoms are present from the inner part of the particles of the lithium-transition metal composite oxide to the surface thereof and have a concentration gradient that is highest at the surface of the particles.

In addition, the lithium-transition metal composite oxide particles obtained in Example 2 was cut, and the cross section of the particles was subjected to the mapping analysis of Ti atoms using a field emission electron probe microanalyzer (FE-EMPA) (Instrument Name; JXA8500F, manufactured by JEOL; Measurement conditions; acceleration voltage: 15 kV, magnification: 3000, irradiation current: 4.861e-08A). The results of the mapping analysis with FE-EPMA allowed it to be verified that Ti atoms are present in the inner part of the particles and on the surface of the particles, and are present in high concentrations particularly on the surface of the particles.

Further, the same FE-EPMA analysis was performed for Examples 1, 3, and 4 and Comparative Examples 2 to 4, and the results allowed it to be verified that Ti atoms are present in the inner part of the particles and on the surface of the particles, and are present in high concentrations particularly on the surface of the particles.

Accordingly, it was possible to verify that, in the lithium-transition metal composite oxide of the present invention, the Ti atoms are present in the depth direction from the surface of the particles of the lithium-transition metal composite oxide and have a concentration gradient that is highest at the surface of the particles.

(5) Verification of the Presence of $Li_2TiO_3$

The presence or absence of the diffraction peak of $Li_2TiO_3$ at 2θ=20.5° was verified by X-ray diffraction (XRD) analysis of a lithium-transition metal composite oxide sample using CuKα radiation as a radiation source.

As a result, it was possible to verify the diffraction peak of $Li_2TiO_3$ in Examples 1 to 4 and Comparative Examples 2 to 4.

(6) The Lattice Constant of the C Axis and the Crystallite Size in the Direction of the (104) Plane The lattice constant was determined by the elaboration of a lattice constant and a structural parameter through Rietveld analysis of the diffraction pattern obtained by X-ray diffraction (XRD) analysis of a lithium-transition metal composite oxide sample using CuKα radiation as a radiation source. The Rietveld analysis is a method of performing the elaboration of the parameter with respect to a crystal structure by fitting a diffraction pattern obtained by actual measurement and a diffraction pattern expected from a crystal structure model, using an X-ray diffraction pattern, in order to extract the information included in this pattern.

The crystallite size was determined from the Scherrer equation as described below (Equation 1) by calculating the half-width of the X-ray diffraction peak of the (104) plane at an angles of diffraction (2θ) of 45°.

$$\text{Crystallite Size D (angstrom)} = K\lambda/(\beta \cos \theta) \quad (1)$$

wherein

K: Scherrer constant (0.9)

λ: The wavelength of an X-ray tube to be used (CuKα=1.5405 angstroms)

β: The width of broadening of the diffraction line by the crystallite size (radian)

θ: The angle of diffraction 2θ/2 (degree)

TABLE 4

| | The content of Ti atoms | Average particle size(μm) | BET specific surface area(m²/g) | The lattice constant of the C-axis(Å) | The crystallite size in the direction of the (104) plane(Å) | $Li_2CO_3$ content (wt %) | Existence or non-existence of the presence of $Li_2TiO_3$ |
|---|---|---|---|---|---|---|---|
| Example 1 | 0.222 | 4.8 | 0.58 | 14.059 | 675 | 0.03 | existence |
| Example 2 | 0.463 | 4.7 | 0.59 | 14.063 | 625 | 0.02 | existence |
| Example 3 | 1.017 | 4.3 | 0.65 | 14.067 | 574 | 0.02 | existence |
| Example 4 | 1.495 | 4.5 | 0.67 | 14.067 | 574 | 0.01 | existence |
| Comparative Example 1 | 0.000 | 4.0 | 0.56 | 14.055 | 724 | 0.07 | non-existence |
| Comparative Example 2 | 0.005 | 4.1 | 0.56 | 14.056 | 712 | 0.05 | existence |
| Comparative Example 3 | 0.009 | 4.3 | 0.57 | 14.057 | 699 | 0.05 | existence |
| Comparative Example 4 | 2.481 | 4.6 | 0.68 | 14.065 | 598 | 0.03 | existence |

<Battery Performance Test>

(1) Preparation of Lithium Secondary Battery

A positive electrode agent was prepared by mixing 91% by weight of a lithium-transition metal composite oxide obtained in any one of Examples 1 to 4 and Comparative Examples 1 to 4, 6% by weight of graphite powder, and 3% by weight of polyvinylidene fluoride, and the resulting positive electrode agent was dispersed in N-methyl-2-pyrrolidinone to prepare a kneaded paste. This kneaded paste was applied to aluminum foil, dried, and punched into a disk with a diameter of 15 mm by pressing to obtain a positive plate.

A coin-type lithium secondary battery was manufactured by using this positive plate and using members such as a separator, a negative electrode, a positive electrode, a current collector plate, fittings, an external terminal, and an electrolyte solution. Among these, metal lithium foil was used as the negative electrode, and as the electrolyte solution, there was used a solution prepared by dissolving 1 mol of $LiPF_6$ in 1 liter of a 1:1 kneaded liquid of ethylene carbonate and methylethyl carbonate.

(2) Performance Evaluation of Battery

The manufactured coin-type lithium secondary battery was operated under the following conditions at room temperature to evaluate the following battery performance. The results are shown in Table 5.

<Evaluation of Cycle Characteristics>

The battery was subjected to charge and discharge operations including first subjecting it to constant-current constant-voltage charge (CCCV charge) in which the battery was charged at 0.5 C to 4.4 V over 2 hours and then the voltage was held at 4.4 V for 3 hours and then subjecting it to constant-current discharge (CC discharge) in which the charged battery was discharged to 2.7 V at a predetermined current amount to be described below. These operations were defined as one cycle, and the discharge capacity was measured for every cycle. This cycle was repeated 20 times, and the capacity maintenance rate was calculated by the following formula (2) from the discharge capacity at the first cycle (1st) and the 20th cycle (20th). Note that the discharge capacity at the first cycle was referred to as the initial discharge capacity.

Capacity maintenance rate (%)=(discharge capacity at the 20th cycle/discharge capacity at the first cycle)×100    (2)

<Evaluation of Rate Characteristics>

The battery was subjected to charge and discharge operations including first subjecting it to constant-current constant-voltage charge (CCCV charge) in which the battery was charged at 0.5 C to 4.3 V over 2 hours and then the voltage was held at 4.3 V for 3 hours and then subjecting it to constant-current discharge (CC discharge) in which the charged battery was discharged to 2.7 V at a predetermined current amount to be described below. These operations were defined as one cycle, and the discharge capacity was measured for every cycle.

The discharge current amount in each cycle was set to 0.2 C for the 1st to 3rd cycles, 0.5 C for the 4th to 6th cycles, 1.0 C for the 7th to 9th cycles, and 2.0 C for the 10th to 12th cycles. The discharge capacity at the 3rd cycle was defined as the discharge capacity at 0.2 C; the discharge capacity at the 6th cycle was defined as the discharge capacity at 0.5 C; the discharge capacity at the 9th cycle was defined as the discharge capacity at 1.0 C; and the discharge capacity at 12th cycle was defined as the discharge capacity at 2.0 C. Further, the average operating voltage at the 3rd cycle was defined as the average operating voltage at 0.2 C; the average operating voltage at the 6th cycle was defined as the average operating voltage at 0.5 C; the average operating voltage at the 9th cycle was defined as the average operating voltage at 1.0 C; and the average operating voltage at 12th cycle was defined as the average operating voltage at 2.0 C.

<Evaluation of Direct Current (DC) Resistance>

The battery was first subjected to constant-current constant-voltage charge (CCCV charge) in which the battery was charged at 0.5 C to 4.3 V over 2 hours and then the voltage was held at 4.3 V for 3 hours. Subsequently, the charged battery was discharged in a temperature controlled bath at 25° C., wherein when it was discharged at 0.2 C, the current value is defined as $I_{0.2C}$ and the potential difference between 0 second and 6 seconds after starting discharge is defined as $\Delta V_{0.2C}$; when it was discharged at 0.5 C, the current value is defined as $I_{0.5C}$ and the potential difference between 0 second and 6 seconds after starting discharge is defined as $\Delta V_{0.5C}$; and when it was discharged at 1.0 C, the current value is defined as $I_{1.0C}$ and the potential difference between 0 second and 6 seconds after starting discharge is defined as $\Delta V_{1.0C}$. The current values were plotted along the x-axis and the potential differences were plotted along the y-axis, and the inclination of a straight line obtained by the least square method was defined as the direct current (DC) resistance at 25° C. In addition, the charged battery was discharged in a temperature controlled bath at −10° C., wherein when it was discharged at 0.2 C, the current value is defined as $I_{0.2C}$ and the potential difference between 0 second and 6 seconds after starting discharge is defined as $\Delta V_{0.2C}$; when it was discharged at 0.5 C, the current value is defined as $I_{0.5C}$ and the potential difference between 0 second and 6 seconds after starting discharge is defined as $\Delta V_{0.5C}$; and when it was discharged at 1.0 C, the current value is defined as $I_{1.0C}$ and the potential difference between 0 second and 6 seconds after starting discharge is defined as $\Delta V_{1.0C}$. The current values were plotted along the x-axis and the potential differences were plotted along the y-axis, and the inclination of a straight line obtained by the least square method was defined as the direct current (DC) resistance at −10° C.

<Swelling Before and After Storage Test>

The battery was subjected to constant-current constant-voltage charge (CCCV charge) in which the battery was charged at 0.5 C to 4.5 V over 2 hours and then the voltage was held at 4.5 V for 3 hours. The thickness of a coin-type lithium secondary battery measured with a micrometer immediately after the charge is defined as $D_0$, and the thickness of the coin-type lithium secondary battery measured with a micrometer immediately after the coin-type lithium secondary battery was stored for 150 hours in a temperature controlled bath at 60° C. is defined as $D_{150}$. The amount of swelling was calculated by the following formula (3).

Swelling (mm)=$D_{150}$−$D_0$    (3)

TABLE 5

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Cycle | Discharge capacity (mAh/g) | 1st | 171.2 | 170.3 | 171.9 | 165.7 | 174.3 | 168.6 | 167.8 | 156.8 |
| | | 20th | 161.9 | 162.0 | 163.0 | 156.9 | 162.8 | 155.9 | 156.2 | 144.0 |
| | Capacity maintenance rate (%) | | 94.6 | 95.1 | 94.8 | 94.7 | 93.4 | 92.4 | 93.1 | 91.8 |
| Rate | Discharge capacity (mAh/g) | 0.2 C | 156.8 | 155.1 | 154.1 | 152.6 | 158.9 | 153.8 | 156.5 | 143.7 |
| | | 0.5 C | 155.3 | 153.5 | 152.3 | 151.0 | 156.5 | 150.6 | 153.9 | 140.8 |
| | | 1.0 C | 153.6 | 152.4 | 151.5 | 149.2 | 152.5 | 146.4 | 151.6 | 138.4 |
| | | 2.0 C | 151.1 | 150.1 | 148.9 | 147.2 | 145.0 | 137.5 | 147.2 | 134.7 |
| | Average operating voltage (V) | 0.2 C | 3.83 | 3.82 | 3.83 | 3.83 | 3.82 | 3.81 | 3.82 | 3.80 |
| | | 0.5 C | 3.86 | 3.80 | 3.83 | 3.85 | 3.77 | 3.81 | 3.83 | 3.79 |
| | | 1.0 C | 3.81 | 3.81 | 3.82 | 3.86 | 3.68 | 3.74 | 3.81 | 3.78 |
| | | 2.0 C | 3.78 | 3.80 | 3.82 | 3.82 | 3.55 | 3.63 | 3.74 | 3.74 |

TABLE 5-continued

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| DCR R(Ω) | 25° C. | 25.9 | 26.4 | 22.0 | 23.8 | 31.8 | 20.6 | 21.4 | 24.3 |
|  | −10° C. | 131.6 | 143.2 | 103.9 | 122.6 | 211.1 | 112.5 | 124.8 | 117.0 |
| Swelling Before and After Storage Test (mm) |  | 0.003 | 0.002 | 0.001 | 0.002 | 0.007 | 0.002 | 0.002 | 0.012 |

Note)
First cycle is shown "1st" and 20th cycle is shown "20th" on the table.

INDUSTRIAL APPLICABILITY

When used as a positive electrode active material for lithium secondary batteries, the positive electrode active material of the present invention can provide a lithium secondary battery which is particularly excellent in cycle characteristics and rate characteristics and low in direct current (DC) resistance and in which the swelling resulting from the generation of gas accompanying the reaction with a nonaqueous electrolyte solution is suppressed.

Further, according to the method for producing a positive electrode active material for lithium secondary batteries of the present invention, the positive electrode active material for lithium secondary batteries can be produced by an industrially advantageous method.

The invention claimed is:

1. A positive electrode active material for lithium secondary batteries comprising a lithium-transition metal composite oxide containing from 0.20 to 2.00% by weight of Ti atoms, which is produced by mixing a lithium compound, a cobalt compound and titanium dioxide and then firing the resulting mixture, wherein the Ti atoms are present in a depth direction from a surface of particles of the lithium-transition metal composite oxide and have a concentration gradient that is highest at the surface of the particles, wherein the lithium-transition metal composite oxide is present as at least $Li_2TiO_3$ and has a lattice constant of a C axis in the range of 14.055 to 14.070 angstroms and a crystallite size in the range of 550 to 700 angstroms in a direction of a (104) plane.

2. The positive electrode active material for lithium secondary batteries according to claim 1, wherein residual $Li_2CO_3$ is 0.10% by weight or less.

3. A lithium secondary battery, wherein the positive electrode active material for lithium secondary batteries according to claim 1 is used.

4. A lithium secondary battery, wherein the positive electrode active material for lithium secondary batteries according to claim 2 is used.

* * * * *